July 12, 1966   M. M. STOLZER   3,260,012
FISH HOOKS AND LURES
Filed Aug. 26, 1964
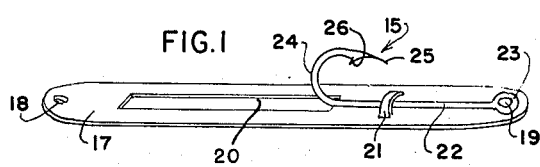
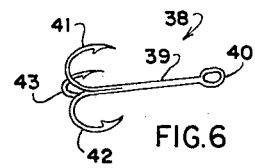
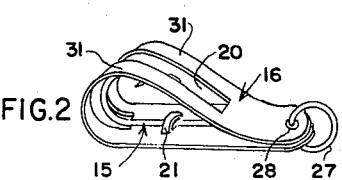
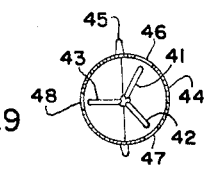
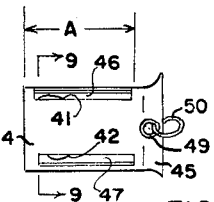
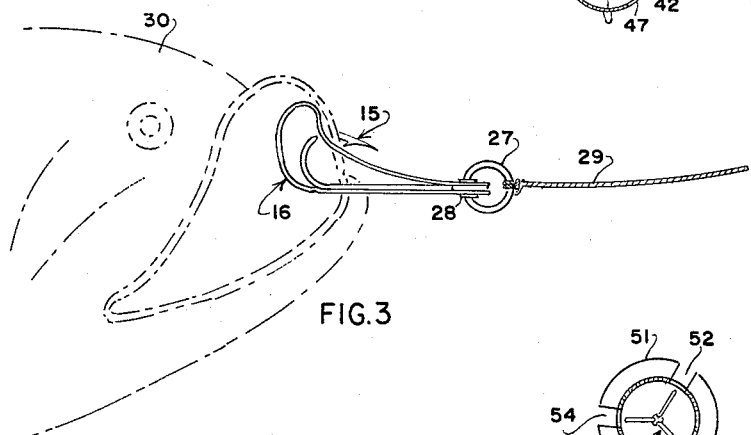
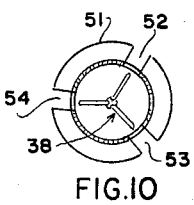
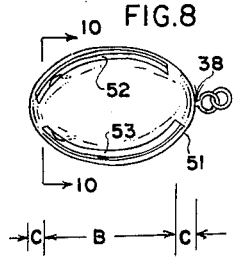
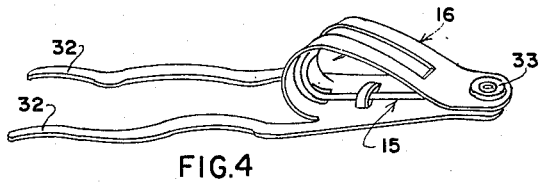
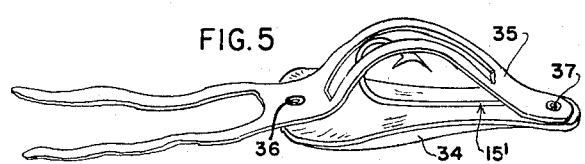
INVENTOR,
Milton M. Stolzer,
BY
ATTORNEY.

3,260,012
FISH HOOKS AND LURES
Milton M. Stolzer, 630 Cedar St., Uniondale, N.Y.
Filed Aug. 26, 1964, Ser. No. 392,173
9 Claims. (Cl. 43—42.1)

The present invention relates to fish hooks and lures.

An object of this invention is to provide novel and improved weedless hooks and lures.

In these items, the hook in its passage through the water is protected by a yieldable guard from being intercepted by weeds, grasses, twigs and the like. When a fish bites, the hook's point becomes exposed and contacts the interior of the fish's mouth. The fisherman gets the "feel" of fish movement, so he sets the hook, that is, he quickly and firmly pulls the line, causing the point and barb of the hook to penetrate the fish's tissue. Of course, the fish struggles violently to get off the hook and sometimes is successful though the flesh is torn in the process.

It is therefore another object of this invention that the guard shall serve to oppose the gaining of such freedom.

A further object of this invention is to provide novel and improved weedless fishing hooks and lures of the character described, having a new mode of operation and which are easy and reasonably cheap to manufacture and efficient in carrying out the purposes for which they are designed.

Other objects and advantages will become apparent as this disclosure proceeds.

For one practice of this invention, the hook is centrally positioned within and across a relatively short tubular structure made of paper thin resilient metal, plastic, rubber or other suitable material, having an elongated peripheral slot through which the point and barb of the hook pass and become exposed when said guarding tubular structure is even slightly collapsed by a fish's bite. In a modified construction, part of the tubular structure is a spoon of rigid material, along which the shank of the hook is secured; the remainder of the tubeform being a slotted foil arch whose ends are secured to the end regions of said spoon respectively. Other embodiments, include wavy tails extending from the tubular structure. Various other novel constructions embodying the teachings of this invention, are also shown herein.

In the accompanying drawing forming part of this specification, similar characters of reference indicate corresponding parts in all the views.

FIG. 1 is a perspective view showing the blank associated with a fish hook, which are to be made into a weedless fish hook structure.

FIG. 2 is a perspective view showing such structure in condition for use.

FIG. 3 shows a fish caught on said weedless fish hook of FIG. 2.

FIG. 4 is a perspective view of a weedless lure embodying the teachings of this invention.

FIG. 5 is a perspective view of another embodiment, showing a lure construction including a spoon.

FIG. 6 is a pictorial view of a treble hook.

FIGS. 7 and 8 are longitudinal views of modified forms of this invention, each employing a treble hook.

FIG. 9 is a section taken at lines 9—9 in FIG. 7.

FIG. 10 is a section taken at lines 10—10 in FIG. 8.

In the drawing, the embodiment shown in FIG. 2, comprises essentially a fish hook designated generally by the numeral 15 which is encompassed by and associated with a collapsible guard denoted generally by the numeral 16. This guard as shown in FIG. 1, may be made of a paper-thin, springy metal or plastic strip 17, which intermediate its end holes 18, 19, has an elongated lengthwise opening or slot 20. A transverse strap 21 is struck up between said slot and the hole 19. The fish hook comprises an elongated shank 22 having an eye 23 at one end and a bight 24 at its other end. Said bight terminates in a point 25 and has a barb 26 a bit inward of said point, directed towards the bight. The plane of said eye 23 is perpendicular to the plane of the bight 24. The shank, positioned on and along said strip 17, is held by said strap 21 so the eye 23 is in registry with the hole 19. Said strip is bent to form a short tubular structure as shown in FIG. 2. The assembly is maintained by for instance the eyelet 28 which is through the hole 18, the eye 23 and the hole 19. The slot is now part way around the periphery of the tubular structure. In normal condition, as shown in FIG. 2, the hook's point 25 and barb 26 are within the tubular structure. A ring 27 through the eyelet 28, serves for attachment of the fishing line 29. When a fish bites as shown in FIG. 3, the guard 16 will be deformed and the point 25 and the barb 26 will become exposed, to hook the fish 30, while the straps 31 will press against the interior mouth surface. This action furthers the engagement of the barb 26 with the fish's mouth flesh and helps to prevent disengagement of the hook in any attempts the fish makes to free itself from the hook.

The modified embodiment shown in FIG. 4 is like FIG. 2 with the addition of the tails 32 which are integral with the strip 17 and extend lengthwise away from the guard 16; said tails being bent in a wavy fashion. The numeral 33 indicates a weight.

Without further illustration, it is readily understood that the guard 16 may be made of a short piece of tubular stock instead of from a piece of strip material.

In the embodiment shown in FIG. 5, the tubular structure is comprised of a rigid spoon 34 as it is commonly called and a flexible strip 35 arched over said spoon and attached thereto by rivets or eyelets 36, 37 at the spoon's ends; the fish hook 15' being mounted on the eyelet 37, between the spoon and said strip.

As shown in the embodiments described, the point 25 and the barb 26, are very near the slot 20 of the guard 16 and the hook is in the central plane between the ends of the tubular structure comprising the guard. Where tails 32 are included, such plane is between them.

The tubular structure may be offered by the portion "A" of a tubular member 44 which is closed at one end by flattening such end into a fantail form 45 and so held by the eyelet 49 which holds the eye 40 of the treble hook 39 and which has the ring 50 for attachment of a fishing line. Said tube 44 houses the hook 38 which is positioned therein therealong and has elongated longitudinal slots 46, 47, 48 through which the distal points and their inward barbs of the bights 41, 42, 43 on the single shank 39, will pass through upon the flattening of said tube when a fish bites it. Or, the tubular structure may be offered by the portion "B" of a hollow spherical or as shown, the ellipsoidal shell 51 which houses the treble hook 38 and is provided with the elongated slots 52, 53, 54; the lengths "C" being quite small as compared to the length "B".

Without further illustration, it is readily understandable that tails like 32 may be attached as part of the guards in the devices shown in FIGS. 7 and 8 and that in all embodiments of this invention, the barbs of the hooks may be outside the guards; it being essential only for the points of the hooks, to be guarded.

Further, it is advisable that the outer surface of the guards have a mirrored finish.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; refer-

I claim:

1. In a device of the character described, a fish hook comprising an elongated shank having a bight at one end which terminates in a point; the other end of the shank being formed as an eye; the plane of said eye being perpendicular to the plane of said bight, and a guard including a tubular structure made of a strip of springy material having a hole at each end thereof; said eye being at the ends of said strip, and means to maintain the assembly, positioned through said eye and holes; said tubular structure being deformable when pinched to flatten; said springy strip having an elongated slot therethrough; said shank being positioned on said tubular structure whereby said point is normally within said tubular structure adjacent said slot in said strip and so that when the tubular structure is pinched to flatten, said slot in said strip will approach the shank, and said point of the hook will pass out of the tubular structure through said slot in said strip.

2. A device as defined in claim 1, wherein said eye is between the ends of said springy strip.

3. A device as defined in claim 1, wherein the hook has a barb near the point, directed towards the bight and normally positioned within said tubular structure; said barb passing through said opening in said springy part when the tubular structure is pinched to bring said point out of the tubular structure.

4. A device as defined in claim 1, wherein the springy material part is paper-thin.

5. A device as defined in claim 1, including springy tails extending from said tubular structure.

6. A device as defined in claim 5, wherein said tails extend away from the tubular member in a direction opposite to the direction the shank extends away from the bight.

7. A device as defined in claim 1, wherein substantially the entire hook is normally within said tubular member.

8. A device as defined in claim 1, wherein the opening in the springy part is an elongated slot of a length a multiplicity of times greater than is necessary to allow the point to pass therethrough.

9. In a device of the character described, a fish hook comprising an elongated shank having a bight at one end which terminates in a point and a guard including a tubular structure comprising a rigid spoon and an arched strip part of springy material secured to said spoon near the ends of said spoon so that said tubular structure is deformable when pinched to flatten; said springy part having an opening therethrough; said shank being secured to said tubular structure whereby said point is normally within said tubular structure adjacent said opening in said springy part and so that when the tubular structure is pinched to flatten, said opening in said springy part will approach the shank and said point of the hook will pass out of the tubular structure through said opening in said springy part.

References Cited by the Examiner

UNITED STATES PATENTS

| | | | |
|---|---|---|---|
| 1,993,018 | 3/1935 | Pfeifle | 43—42.1 |
| 2,325,107 | 7/1943 | Burns | 43—42.1 |
| 2,600,673 | 6/1952 | Murray | 43—42.1 |
| 2,635,381 | 4/1953 | Coons | 43—42.24 |
| 2,913,849 | 11/1959 | Rolstone | 43—42.41 |

SAMUEL KOREN, *Primary Examiner.*

W. H. CAMP, *Assistant Examiner.*